United States Patent
Oishi et al.

[15] 3,660,689
[45] May 2, 1972

[54] TIMING SIGNAL GENERATING SYSTEM FOR INTERNAL COMBUSTION ENGINES

[72] Inventors: Kazuo Oishi; Tokuhiro Kurebayashi; Noriyoshi Ando; Noboru Yamamoto; Hiroshi Yoshida, all of Kariya, Japan

[73] Assignee: Nippondenso Kabushiki Kaisha, Aichi-ken, Japan

[22] Filed: Sept. 8, 1970

[21] Appl. No.: 70,453

Related U.S. Application Data

[63] Continuation-in-part of Ser. No. 36,767, May 13, 1970, abandoned.

[30] Foreign Application Priority Data

May 14, 1969 Japan.....................................44/37278
Sept. 9, 1969 Japan.....................................44/71362
Sept. 9, 1969 Japan.....................................44/71365

[52] U.S. Cl..................307/269, 123/32 EA, 123/148 E, 307/228, 307/261, 307/293, 328/63, 328/72, 328/74
[51] Int. Cl....................H03k 5/00, H03k 17/00, F02p 1/00
[58] Field of Search..............123/32 EA, 119, 139 E, 148 E; 307/228, 260, 261, 265, 269, 293; 328/22, 28, 31, 35, 36, 59, 63, 72, 74, 77, 127, 146, 209

[56] References Cited

UNITED STATES PATENTS

| | | | |
|---|---|---|---|
| 3,002,153 | 9/1961 | Williams, Jr. | 324/16 S |
| 2,936,744 | 5/1960 | Paule et al. | 123/32 EA |
| 3,314,407 | 4/1967 | Schneider | 324/16 T |
| 3,338,221 | 8/1967 | Scholl | 123/32 EA |
| 3,577,007 | 5/1971 | Cross | 324/16 S |

Primary Examiner—Stanley D. Miller, Jr.
Attorney—Cushman, Darby & Cushman

[57] ABSTRACT

A timing signal generating system for internal combustion engines having a wave shaping circuit generating a pulse signal in response to an output signal generated by a signal generator at a fixed rotational angle of the engine. A saw-tooth wave having a fixed magnitude is generated by a saw-tooth wave generator in synchronism with the pulse signal and is reset at a fixed angular reference point. A rectangular wave whose on-off ratio is related to a preset signal from an angular advance setting device or from a setting voltage generator is derived from the saw-tooth wave and is integrated. A timing output signal is derived from the rectangular wave. The integrated output of the rectangular wave which is linearly related to the ignition or fuel injection timing and the preset signal from the angular advance setting device are compared and the resulting difference signal is fed back to means for generating the rectangular wave. This arrangement provides for a constant check on whether or not the ignition or fuel injection timing agrees with the preset signal, thus determining the ignition or fuel injection timing accurately without being affected by changes in external conditions.

25 Claims, 19 Drawing Figures

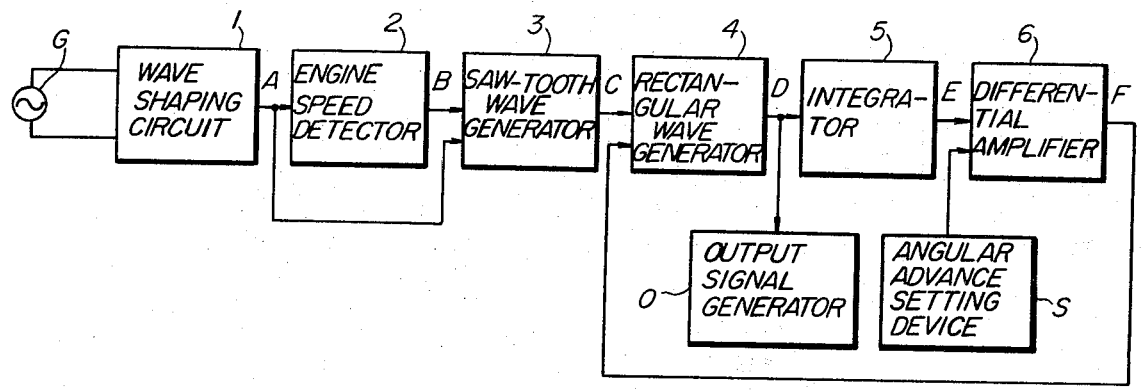
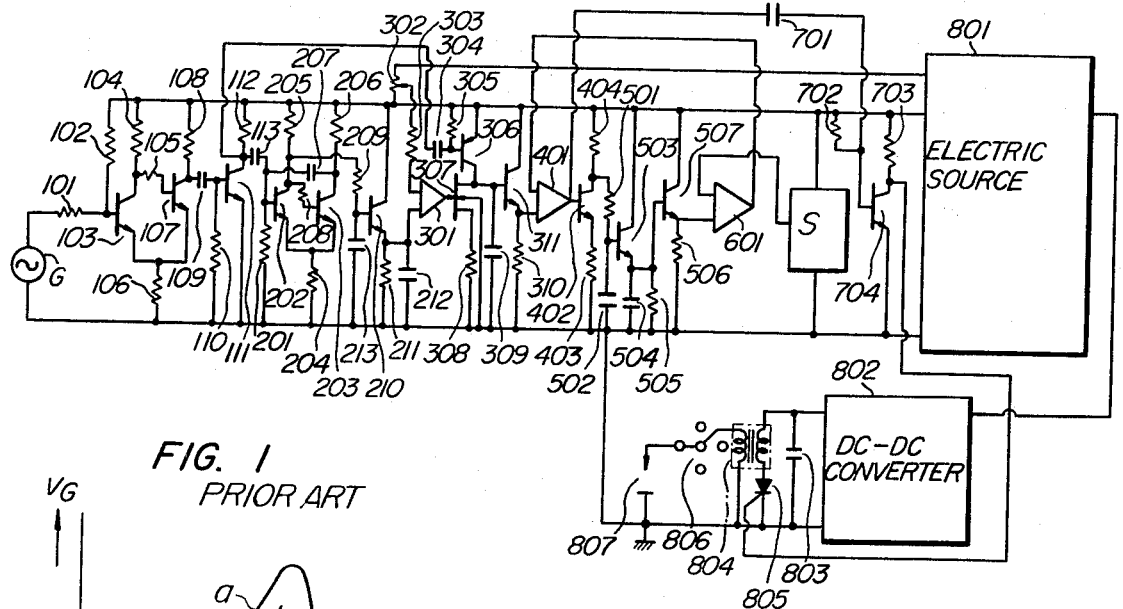
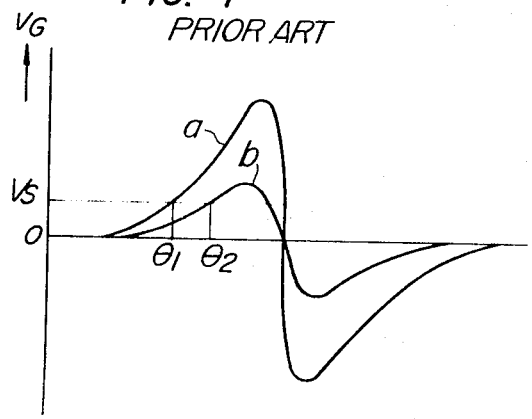

TIMING SIGNAL GENERATING SYSTEM FOR INTERNAL COMBUSTION ENGINES

CROSS-REFERENCE TO THE RELATED APPLICATION:

This application is a continuation-in-part of U.S. Ser. No. 36,767, now abandoned, filed on May 13, 1970.

BACKGROUND OF THE INVENTION

1. Field of the Invention

This invention relates to a timing signal generating system for internal combustion engines and more particularly to a signal generating system for internal combustion engines which generates a signal for ignition, fuel injection and the like.

2. Description of the Prior Art

One form of ignition control systems for internal combustion engines heretofore employed in the art has comprised a signal generator provided with a permanent magnet rotating in synchronism with the rotation of the engine and an amplifier for amplifying the output voltage of the signal generator. According to this system, the saturation characteristic of the amplifier is utilized to detect the timing at which the voltage $V_G$ generated by the signal generator attains a predetermined voltage level $V_s$ thereby to generate a signal for ignition or fuel injection. In other words, the prior art ignition control system of this kind has been so designed that the output voltage $V_G$ of the signal generator attains the predetermined voltage level Vs at a predetermined angular position $\theta_1$ of rotation of the crankshaft of the engine at which the ignition or fuel injection should occur.

Another system heretofore proposed has comprised a switch disposed adjacent to the outer periphery of a rotary member equipped with a permanent magnet rotating in synchronism with the engine so that, as soon as the rotary member takes an angular position of rotation at which the ignition or fuel injection should occur, the switch is subject to switching to provide a signal for attaining the ignition or fuel injection.

However, the former system employing a signal generator has been defective in that, when, for example, the number of revolutions per unit time of the engine is decreased resulting in a variation of the voltage $V_G$ generated by the signal generator, the predetermined voltage level Vs may be detected at an angular position $\theta_2$ of rotation of the crankshaft of the engine which angular position is fairly displaced from $\theta_1$. In other words, the former system has been defective in that the timing at which the signal for attaining the ignition or fuel injection is generated is affected directly by the number of revolutions per unit time of the engine, hence the wave-form of the output voltage of the signal generator and thus it is extremely difficult to freely adjust the ignition or fuel injection timing. The latter system employing a switch has also been defective in that the relative position of the switch and the rotary member must be varied each time it is desired to vary the ignition or fuel injection timing and thus a very troublesome procedure accompanied by technical difficulty is involved.

SUMMARY OF THE INVENTION

It is therefore a primary object of the present invention to provide a timing signal generating system for internal combustion engines which overcomes the prior defects described above.

According to one aspect of the present invention, there is provided a timing signal generating system for internal combustion engines comprising a signal generator for generating a signal voltage in a predetermined angular position of rotation of the engine in synchronism therewith, a wave shaping circuit for generating a synchronizing signal indicative of a reference angular position of rotation of the engine in response to the output of the said signal generator, a saw-tooth wave generator for generating a saw-tooth wave of constant peak magnitude in synchronism with the output pulse signal of the said wave shaping circuit, a rectangular wave generator for generating a rectangular pulse of constant amplitude when the saw-tooth wave generated by the said saw-tooth wave generator attains a preset level, an integrator for integrating the output voltage of the said rectangular wave generator thereby to produce a DC output voltage which is proportional to the on-off ratio of the rectangular wave, and a differential amplifier operative upon receiving the DC output voltage of the said integrator and a preset signal voltage corresponding to a desired timing to produce an output signal representative of the difference between the said two voltages, the output signal of the said differential amplifier being fed back to the said rectangular wave generator as an input voltage to the latter, and a timing signal being derived from the output terminal of the said rectangular wave generator.

According to another aspect of the present invention, there is provided a timing signal generating system for internal combustion engines comprising a signal generator for generating a signal voltage in a predetermined angular position of rotation of the engine in synchronism therewith, a wave shaping circuit for generating a synchronizing signal indicative of a reference angular position of rotation of the engine in response to the output of the signal generator, an engine speed detector for generating an output voltage which is linearly related to the engine speed, a saw-tooth wave generator for generating a saw-tooth wave whose voltage level is kept substantially constant in any given angular position of rotation of the engine by the output of the engine speed detector, the saw-tooth wave being reset by the synchronizing signal, a rectangular wave generator for generating a rectangular wave in response to the saw-tooth wave of the saw-tooth wave generator and another input voltage, the rectangular wave having its leading edge corresponding to the occurrence of the synchronizing signal and the trailing edge corresponding to a point in the saw-tooth wave determined by the said another input voltage, an integrating circuit for integrating the output voltage of the rectangular wave generator to produce a DC output voltage which is proportional to the on-off ratio of the rectangular wave, and a comparator for receiving the DC output voltage of the integrating circuit and a preset signal voltage corresponding to a desired timing to produce a voltage difference therebetween, the voltage difference signal of the comparator being fed back to the rectangular wave generator as the said another input voltage, a timing signal being derived from the output of the rectangular wave generator.

In accordance with the present invention, the following marked advantages can be obtained:

1. Irrespective of any variation in the number of revolutions per unit time of the engine, it is possible to obtain a rectangular wave whose area per unit time is always constant, which is synchronized with a given angular position of rotation of the crankshaft of the engine and which has a voltage level corresponding to the specific angular position of rotation of the crankshaft. Thus, a timing signal for attaining the ignition, fuel injection, or the like can be very precisely derived from the rectangular wave at any angular position of rotation of the crankshaft.

2. Since the signal generator for deriving a synchronizing signal in the particular angular position of rotation of the engine is less restricted on its output wave-form and output voltage and the like and can only detect a one-rotation angle which forms a reference, a simple generator or other signal generator of such construction as having a small projection on its periphery will be sufficient to serve for the purpose. Furthermore, the output voltage of the signal generator is limited only by the fact that it can sufficiently drive the following stage, and thus, the signal generator should not necessarily be mounted in the conventional position, namely, within the distributor.

3. Since for any given engine speed the instantaneous saw-tooth wave output magnitude corresponds substantially to the instantaneous rotational angle of the engine, it is easy to determine the preset timing on the basis of the rectangular wave whose trailing edge changes linearly with the rotational angle of the engine.

4. Since the output waveform is derived from the rectangular wave whose on-off switching points are at the reference rotational angle and the preset rotational angle, whereby if at one switching point an on-off switching is performed, an off-on switching is at the other switching point, and the switching points can be easily discriminated by differentiating the rectangular wave, thus facilitating the detection of the preset timing and the formation of the signal output.

5. One of the most important features of this invention lies in a feedback type of preset timing correction mechanism comprising a rectangular wave generator, an integrator and a differential amplifier, in which the integrator produces an output proportional to the preset timing in response to the output of the rectangular wave generator, and the comparator functions to compare the output of the integrator with the preset value for determining whether the output and the preset value are in accord with each other and to correct the output if they are not in accord with each other, whereby even if the saw-tooth wave input from the saw-tooth wave generator has a waveform which does not exactly correspond to the rotational angle of the engine the output of the rectangular wave generator can be accurately corrected by the integrator and the comparator. Thus, where the saw-tooth wave input varies according to the varying external conditions, the preset timing can constantly be controlled with high accuracy.

6. As is apparent from the foregoing, since the output of the integrator is controlled in such a manner that it is proportional to the preset timing, the timing can be preset by causing the angular advance setting device to have a controllable linear output, thus facilitating presetting the angular advance setting device in dependence upon the engine speed and the negative pressure of an intake manifold.

BRIEF DESCRIPTION OF THE DRAWINGS

FIG. 1 is a graph showing the waveform of a voltage generated by a signal generator for illustrating the operation of the prior art system described previously.

FIG. 2 is a block diagram of a system according to this invention.

FIG. 3 is a circuit diagram of the system according to one embodiment of this invention.

DESCRIPTION OF THE PREFERRED EMBODIMENTS

Figure 4:
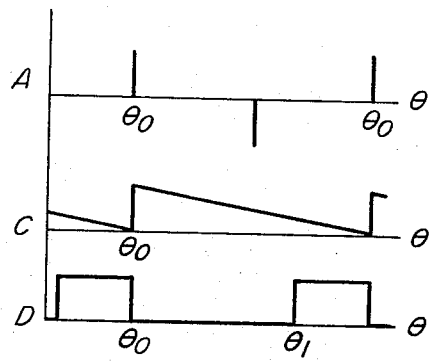
FIG. 4 is a voltage diagram as appearing at the points A, C, and D of FIG. 2.

FIG. 1 shows the waveform of a voltage generated by a signal generator in the prior art ignition control system described previously. The voltage waveform varies depending on the number of revolutions per unit time of the engine and may be represented by the curve $a$ at a certain number of revolutions per unit time of the engine and by the curve $b$ at a reduced number of revolutions per unit time of the engine. It will thus be seen that the angular position of rotation of the engine crankshaft when the output voltage $V_G$ of the signal generator attains a predetermined voltage level $V_S$, that is, a constant voltage determining the ignition or fuel injection timing varies between $\theta_1$ and $\theta_2$ depending on the number of revolutions per unit time of the engine, giving rise to a problem that the ignition or fuel injection timing cannot be determined without being affected by variations in external conditions. Such trouble can be obviated by the present invention which will be described in detail hereunder.

Referring to the drawings, particularly to FIG. 2, an ignition control system for an internal combustion engine comprises a signal generator G for generating a signal in synchronism with the operation of the engine, a wave shaping circuit 1 responsive to the signal to produce a synchronizing pulse signal at a reference point, an engine speed detector 2 responsive to the pulse signal of the wave shaping circuit 1 to produce a DC signal proportional to the engine speed, a saw-tooth wave generator 3 responsive to the signals from the wave shaping circuit 1 and the engine speed detector 2 to produce a saw-tooth wave signal having substantially the same voltage level at any given rotational angle of the engine, a rectangular wave generator responsive to the saw-tooth wave signal and a signal supplied from a comparator or differential amplifier 6, as will be explained later, to produce a rectangular wave having a predetermined on-off ratio corresponding to a preset signal, an integrator 5 responsive to the output of the rectangular wave generator to produce a voltage proportional to the on-off ratio, the differential amplifier 6 responsive to the integrated signal and the preset signal from an angular advance setting device S to compare both the said signals for producing a signal corresponding to the difference therebetween, and an output signal generator 0 for providing an output signal.

Figure 5:
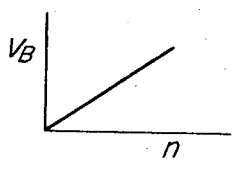
FIGS. 5 and 6 are output voltage diagrams as appearing at the points B and D of FIG. 2.

In operation, the wave shaping circuit 1 receives the output signal of the signal generator G to generate a pulse having an extremely short pulse width at the predetermined point of signal waveform, or when a piston moves to a predetermined point in a cylinder. Such a pulse signal can be easily generated, for example, by utilizing the output signal which changes in polarity at the predetermined point. When the pulse signal is generated, the engine speed detector 2 produces a voltage proportional to the number of such pulses generated per unit time. One example of the engine speed detector 2 is a monostable multivibrator whose output signal is integrated. The output signal of the wave shaping circuit 1 has a waveform as shown in FIG. 4A. The output voltage $V_B$ of the engine speed detector 2 is proportional to the engine speed $n$, as shown in FIG. 5. The saw-tooth wave generator 3 receives the outputs of the wave shaping circuit 1 and the engine speed detector 2 to produce a voltage which changes linearly dependent upon the rotational angle of the engine. The slope of the saw-tooth wave varies according to the output voltage of the engine speed detector 2 which is proportional to the engine speed, and is reset in a predetermined angular position. By so doing, it is possible to obtain an output voltage having substantially the same level or instantaneous magnitude for any given instantaneous rotational angle. The saw-tooth waveform is shown in FIG. 4C. The saw-tooth wave generator 3 may be comprised, for example, of an integrating circuit comprising either one of a differential amplifier, a transistor, a vacuum tube and an FET, and a capacitor together with a switching element for resetting operations. An exact one-to-one relationship between the rotational angle of the engine and the output voltage level of the saw-tooth wave generator is not necessarily required due to the effect of a feedback mechanism, as will be explained later.

Figure 6:
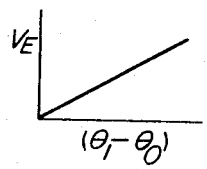
Figure 7:
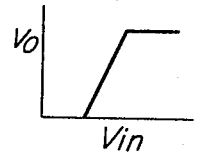
FIG. 7 shows an input-output characteristic of the differential amplifier of FIG. 2.
Figure 8:
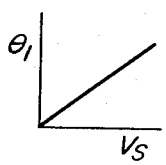
FIG. 8 shows a relationship between the preset voltage and the ignition timing in the present system.

Comparison of the saw-tooth wave thus obtained with the DC voltage level corresponding to the preset signal by the rectangular wave generator 4 produces a rectangular wave which is reset in the reference angular position $\theta_o$ of rotation of the engine and cuts off in an angular position $\theta_1$ corresponding to the preset DC voltage level. This rectangular wave is shown in FIG. 4D. The rectangular wave generator 4 may be comprised of a comparing saturable amplifier having an extremely large amplification factor. The output of the rectangular wave generator 4 is passed through the output signal generator 0 to form a signal having a waveform necessary for ignition, namely, an ignition signal. It is to be noted that the ignition occurs at the rotational angle $\theta_1$ corresponding to the preset voltage level at which the rectangular wave rises. The present system is further characterized in that it functions to correct the ignition timing by checking whether or not the rectangular wave is reset in the reference angular position $\theta_0$ of rotation of the engine and rises in the angular position $\theta_1$ corresponding to the preset DC voltage level. This feature of the present system is provided by the integrator 5 and the differential amplifier 6. The integrator 5 integrates the output of the rectangular wave generator 4 and converts the integrated output into a DC voltage level corresponding thereto. The output signal of the integrator 5 thus obtained is a voltage having a level corresponding to the on-off ratio of the output rectangular wave of the rectangular wave generator 4. The output voltage $V_E$ is proportional to a value $(\theta_1 - \theta_0)$ corresponding to the on-off ratio, as shown in FIG. 6. As the ignition occurs in the angular position $\theta_1$ of rotation of the engine, as described above, it is possible to determine the ignition timing by the use of a voltmeter (not shown) connected to the output of the integrator 5. The differential amplifier 6 compares the output signal of the integrator 5 with the output signal from the angular advance setting device S to produce an output voltage corresponding to the difference therebetween. Thus, when both the output signals are of the same level, the differential amplifier 6 is in its balanced state, and when they do not agree, the output voltage of the differential amplifier 6 deviates from the value obtained in the balanced state. The output voltage $V_0$ of the differential amplifier 6 is shown in FIG. 7. The abscissa of the graph shown in FIG. 7 indicates the voltage difference $V_{in}$ between the preset voltage and the output voltage of the integrator 5. It should be noted that even if the output voltage level of the saw-tooth wave generator 3 has no exact one-to-one correspondence with the rotational angle of the engine, the rectangular wave generator 4 produces an output having a desired rectangular waveform whose leading edge is indicative of the ignition timing, by connecting the output of the differential amplifier 6 to one of the inputs of the rectangular wave generator 4. In other words, since, as described above, the ignition timing corresponds to the angular position $\theta_1$ in which the rectangular wave rises after it is reset in the reference angular position $\theta_0$, and the output voltage $V_E$ of the integrator 5 is proportional to a value $(\theta_1 - \theta_0)$, as shown in FIG. 6, the output voltage $V_E$ is indicative of the ignition timing. Thus, a rectangular wave whose leading edge exactly corresponds to the ignition timing can be produced by applying the output signal of the differential amplifier 6 to the input of the rectangular wave generator 4 in such a manner that the difference between the output voltage $V_E$ and the preset voltage from the angular advance setting device S reaches zero.

On the other hand, since the output voltage $V_E$ of the integrator 5 which is indicative of the ignition timing simply changes linearly with $(\theta_1 - \theta_0)$ and accordingly with the change in the ignition timing, and the output signal of the differential amplifier 6 corresponds to the voltage difference between the output voltage of the integrator 5 and the preset voltage from the angular advance setting device S, it is possible to set the angle of advance simply by varying the preset voltage linearly. Since, as described above, the angle of advance is varied linearly by varying the preset voltage in a linear fashion, it becomes easier to provide the angular advance setting system with the desired characteristics.

It is to be noted that the angular advance setting device S is adapted to produce a preset voltage in consideration of the contributions to the angle of advance by other factors, for example, the engine speed and the engine load.

Figure 9:
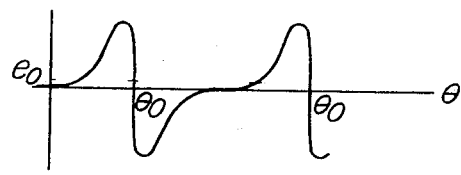
FIG. 9 is an output voltage diagram of the signal generator of the present system.

FIG. 3 shows a circuit diagram of one embodiment of the present system described above. The signal generator G employed in this embodiment is a generator whose rotor rotates in synchronism with the rotation of the engine. The output voltage $e_0$ of the signal generator G is shown in FIG. 9, in which the voltage $e_0$ changes from negative to positive in the reference angular position $\theta_0$ which is independent of the engine speed.

The present system will be described in more detail in connection with the construction arrangement and the operation thereof.

The wave shaping circuit 1 shown in the block diagram of FIG. 2 comprises an input resistor 101, a bias resistor 102, a fore-stage transistor 103 of a Schmitt circuit, a load resistor 104 for the transistor 103, a coupling resistor 105, a common emitter resistor 106, a post-stage transistor 107 of the Schmitt circuit, a load resistor 108 for the transistor 107, a differentiating capacitor 109, a differentiating resistor 110, a transistor 111 for amplifying a differentiated pulse, a load resistor 112 for the transistor 111, and a coupling capacitor 113. In this wave shaping circuit 1, the output wave form of the signal generator G is shaped into a rectangular wave by the Schmitt circuit comprising the transistors 103 and 107. Then, the rectangular wave is differentiated by the differentiator comprising the capacitor 109 and the resistor 110 and the differentiated wave of one polarity is amplified by the amplifying transistor 111. The pulse wave appearing across the load resistor 112 is indicative of the above-mentioned reference angular position $\theta_0$ which acts as a synchronizing signal.

The engine speed detector 2 of FIG. 2 comprises a bias resistor 201, a fore-stage transistor 202 and a post-stage transistor 203 for a monostable multivibrator, a common emitter resistor 204, a load resistor 205 for the fore-stage transistor 202, a load resistor 206 for the post-stage transistor 203, a coupling capacitor 207, a coupling resistor 208, an integrator comprising a resistor 209 and a capacitor 213, a transistor 210 arranged in an emitter-follower fashion, and a smoothing circuit comprising a resistor 211 and a capacitor 212. The engine speed detector 2 is adapted to produce a DC voltage proportional to the engine speed. Specifically, application of an input pulse to the monostable multivibrator comprising the transistors 202 and 203 by way of the capacitor 113 renders the transistor 202 conducting for a fixed time period to thereby produce a rectangular wave having a fixed duration which is then integrated by the combination of the resistor 209 and the capacitor 213. Thus, there appears across this capacitor 213 a voltage which is proportional to the engine speed, since the number of the rectangular pulses per unit time is proportional to the engine speed. The transistor 210, resistor 211, and capacitor 212 are employed in order to derive a substantially DC current from the voltage appearing across the capacitor 213.

The saw-tooth wave generator 3 shown in FIG. 2 in block form comprises a differential amplifier 301, a variable bias resistor 302, an input resistor 303, a coupling capacitor 304, a bias resistor 305, a resetting transistor 306, a field effect transistor 307, a source resistor 308, a capacitor 309 for generating a saw-tooth wave, a load resistor 310, a transistor 311 arranged in an emitter-follower fashion. It should be noted that since if a saw-tooth wave signal having a fixed time constant is generated irrespective of the engine speed the voltage level of the saw-tooth wave signal at any given rotational angle of the engine varies dependent upon the engine speed, the saw-tooth wave generator 3 is adapted to produce a saw-tooth wave whose slope increases as the engine speed is increased. Specifically, the differential amplifier 301 has the output side connected to the gate of the field effect transistor 307 so that the gate voltage of the field effect transistor 307 varies with the engine speed. With the field effect transistor 307 connected to the differential amplifier 301 in this manner, a current signal having a constant level which is proportional to the engine speed is derived from the drain of the field effect transistor 307. Thus, the capacitor 309 discharges linearly, the voltage thereacross substantially corresponding to the rotational angle of the engine and being independent of the engine speed. When the engine rotates to the reference angular position $\theta_0$, the resetting transistor 306 is rapidly rendered conducting to charge the capacitor 309 for a short time. This experiment revealed that for a charging time of 30 μsec, a saw-tooth wave which is sufficient even for high speed rotation is produced. It is to be noted that where it takes a long time to charge the capacitor 309, the proportion of the charging time to the duration of the saw-tooth wave becomes larger as the engine speed is increased, and thus difficulties are encountered in setting the ignition timing over a wide range. The saw-tooth wave is amplified by the emitter-follower transistor 311.

The rectangular wave generator 4 of FIG. 2 comprises a comparing saturable amplifier 401, a transistor 402 for amplifying the output signal of the saturable amplifier 401, an emitter resistor 403 and a load resistor 404. The rectangular wave generator 4 is adapted to produce a rectangular wave which rises at a predetermined position by causing the saturable amplifier 401 to compare the saw-tooth input level from the saw-tooth wave generator 3 and the output signal level from the differential amplifier 6. The rectangular output signal is derived from the output of the comparing saturable amplifier 401 and is then differentiated by the differentiating capacitor 701 and resistor 702.

The integrator 5 shown in FIG. 2 comprises an integrating resistor 501, an integrating capacitor 502, an emitter-follower transistor 503, a smoothing capacitor 504, a smoothing resistor 505, a load resistor 506 and an emitter-follower transistor 507. The rectangular wave signal from the rectangular wave generator 4 is integrated by the integrating circuit comprising the resistor 501 and the capacitor 502. The signal thus obtained is proportional to the on-off ratio of the rectangular wave output of the saturable amplifier 401 and accordingly to the value ($\theta_1 - \theta_0$), as shown in FIG. 6. This signal is amplified and smoothed by the transistors 503 and 507.

Designated at 601 is the differential amplifier 6 shown in FIG. 2, which functions to compare the preset signal from the ignition angular advance setting device S with the output signal from the integrator 5 for producing an output voltage corresponding to the difference therebetween. The output voltage is fed back to the input of the saturable amplifier 401 in order to correct the on-off ratio of the rectangular wave output of the amplifier 401 so that the rectangular wave cuts off in a proper position.

The output of the comparing saturable amplifier 401 thus obtained is differentiated by the capacitor 701 and the resistor 702 and is then amplified by the transistor 704 having a load resistor 703 connected thereto. The capacitor 701, the resistor 702 and the resistor 703 together comprises the output signal generator 0 shown in FIG. 2.

Furthermore, in the right-hand portion of FIG. 3, the numeral 801 designates an electric source, 802 a DC–DC converter, 803 a discharging capacitor, 804 an ignition coil, 805 a silicon controlled rectifier, 806 a distributor, and 807 an ignition plug. When the discharging capacitor 803 is charged by the DC–DC converter 802, the output signal of the transistor 704 triggers the SCR 805 for conduction, thereby to cause the capacitor 804 to discharge through the primary windings of the ignition coil 804. The discharging of the capacitor 803 through the ignition coil 804 produces a high voltage across the secondary windings of the coil 804, thus actuating the ignition plug 807 for ignition by way of the distributor 806.

Figure 10:
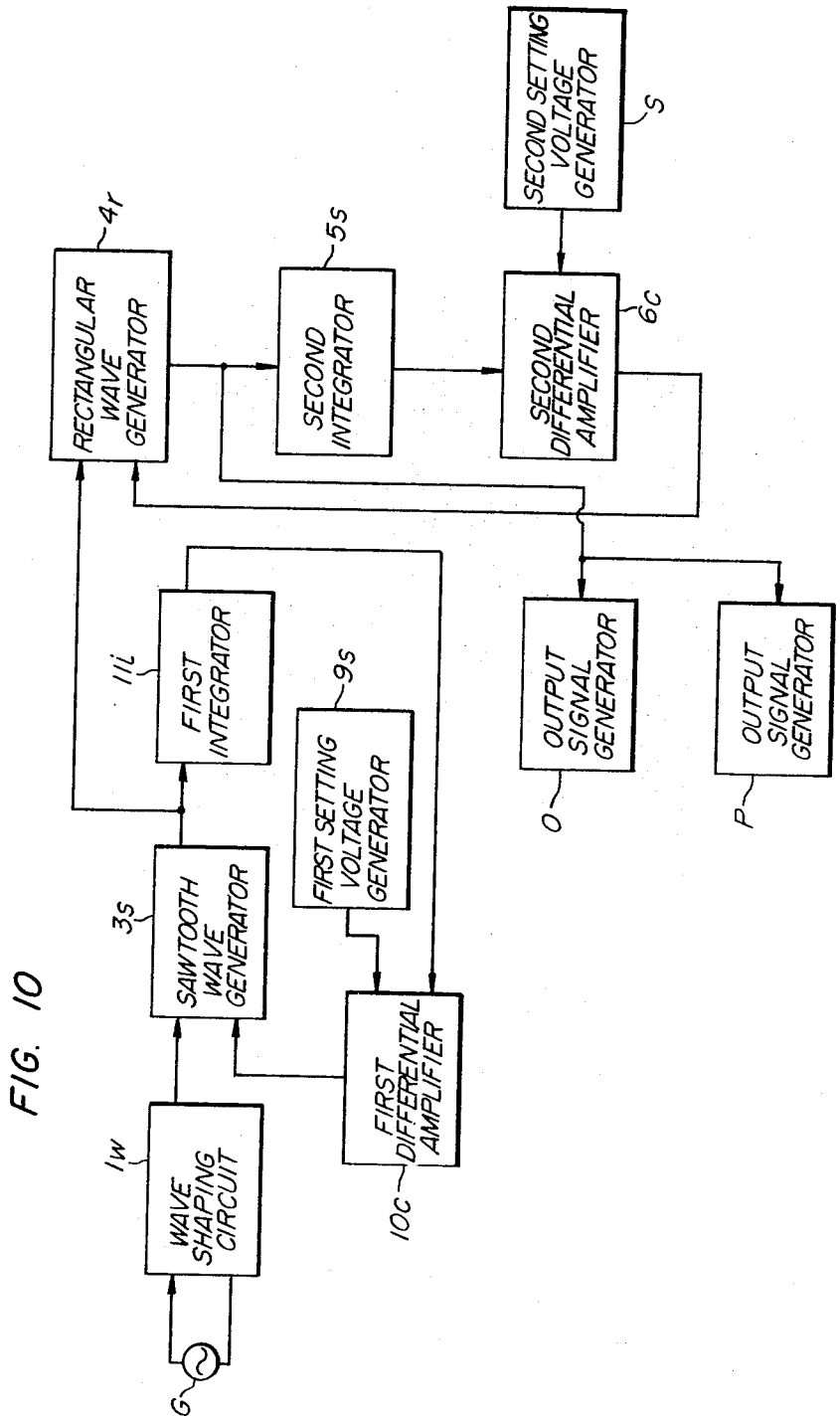
FIG. 10 is a block diagram of another embodiment of the present invention.

The structure and operation of another embodiment of the present invention will be described with reference to FIGS. 10 through 14. Referring to FIG. 10, an ignition control system for an internal combustion engine comprises a signal generator G, a wave shaping circuit 1w, a saw-tooth wave generator 3s, a first setting voltage generator 9s, a first differential amplifier 10c, a first integrator 11i composed of a CR smoothing circuit, a rectangular wave generator 4r, a second integrator 5s composed of a CR smoothing circuit, a second setting voltage generator 12s, a second differential amplifier 6c, an ignition device 0 of the capacitor discharging type, and a fuel injection device P.

The signal generator G generates a signal only when the crankshaft of the engine takes a predetermined angular position of rotation like the preceding embodiment and thus the angular position of rotation of a predetermined point on the crankshaft can be detected always in spite of any variation in the operating conditions, especially the number of revolutions of the engine. The output signal of the signal generator G is supplied to the wave shaping circuit 1w which generates a pulse signal by detecting the predetermined specific angular position of rotation of the crankshaft depending on the level of the output signal of the signal generator G. The pulse signal delivered from the wave shaping circuit 1w is supplied to the saw-tooth wave generator 3s which generates a saw-tooth wave signal in synchronism with the pulse signal. The saw-tooth wave signal delivered from the saw-tooth wave generator 3s is supplied to the first integrator 11i where the signal is integrated and smoothed out to be converted into a DC voltage the level of which is proportional to the area of the saw-tooth wave. The first setting voltage generator 9s generates a first setting voltage so as to maintain the area per unit time of the saw-tooth wave always constant. The first setting voltage and the DC output voltage of the first integrator 11i are compared with each other in the first differential amplifier 10c so that an output voltage corresponding to the difference between the two input voltages is applied from the differential amplifier 10c to the saw-tooth wave generator 3s as a negative feedback input. When the DC output voltage of the first integrator 11i is smaller than the first setting voltage, the output voltage of the first differential amplifier 10c acts to enlarge the area of the saw-tooth wave, while when the DC output voltage of the first integrator 11i is larger than the first setting voltage, the output voltage of the first differential amplifier 10c acts to reduce the area of the saw-tooth wave. Thus, the area per unit time of the saw-tooth wave can be kept constant in spite of any variation in the number of revolutions per unit time of the engine.

The saw-tooth wave signal delivered from the saw-tooth wave generator 3s is also supplied to the rectangular wave generator 4r which generates a rectangular pulse of constant amplitude when the saw-tooth wave signal reaches a given level. The rectangular pulse is integrated and smoothed out by the second integrator 5s to be converted into a DC voltage which is proportional to the pulse width or on-off ratio. The second setting voltage generator 12s generates a second setting voltage for determining the ignition timing and fuel injection timing. The second setting voltage and the DC output voltage of the second integrator 5s are compared with each other in the second differential amplifier 6c so that an output voltage corresponding to the difference between the two input voltages is applied from the differential amplifier 6c to the rectangular wave generator 4r as a negative feedback input. When the DC output voltage of the second integrator 5s is smaller than the second setting voltage, the output voltage of the second differential amplifier 6c acts to cause the rectangular pulse to rise earlier so as to increase the pulse width, while when the DC output voltage of the second integrator 5s is larger than the second setting voltage, the output voltage of the second differential amplifier 6c acts to cause the rectangular pulse to rise slower so as to decrease the pulse width. Thus, the pulse width of the rectangular pulse, or more strictly, the rising timing of the rectangular pulse is controlled depending on the second setting voltage. The falling timing of the rectangular pulse is kept constant as it is dependent upon a predetermined angular position of rotation of the crankshaft as will be described later. It will be seen that the DC output voltage of the second integrator 5s and the second setting voltage are compared with each other and the difference therebetween is applied as a negative feedback input to the rectangular wave generator 4r so as to check whether or not the pulse width and rising timing of the rectangular pulse match the second setting voltage which determines the ignition timing and fuel injection timing so that finally the pulse width and rising timing of the rectangular pulse can be made to correspond to the second setting voltage. Further, the preset level for the saw-tooth wave at which level the rectangular pulse is generated is determined by the second setting voltage. The rectangular pulse signal thus derived from the rectangular pulse generator 4r is applied to the ignition device O and the fuel injection device P to cause ignition and fuel injection.

Figure 11:
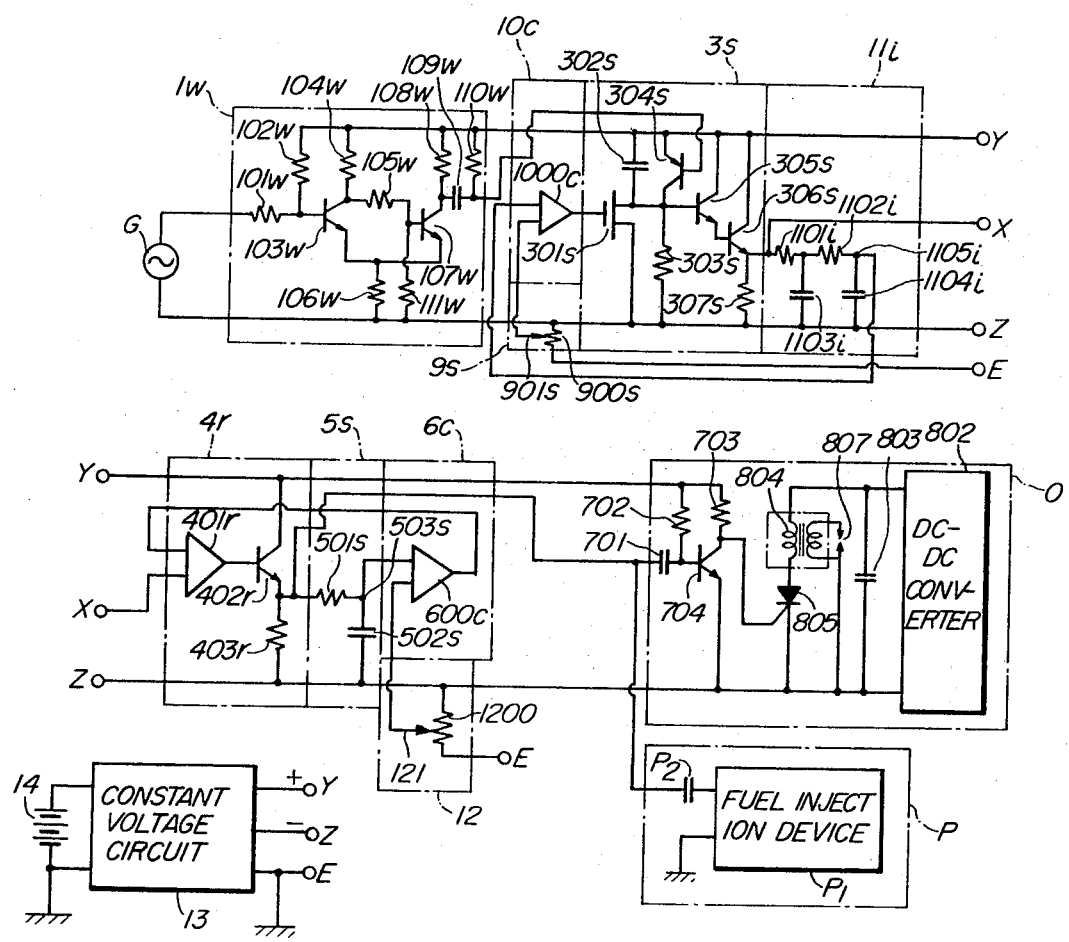
FIG. 11 is a circuit diagram of the embodiment shown in FIG. 10.

FIG. 11 is a detailed circuit diagram of the embodiment of the present invention shown in FIG. 10. Referring to FIG. 11, the wave shaping circuit 1w connected to the signal generator G generating a signal in synchronism with the rotation of the engine comprises a Schmitt circuit and a differentiator. The Schmitt circuit includes a pair of transistors 103w and 107w, collector resistors 104w and 108w for the respective transistors 103w and 107w, a base biasing resistor 102w for the transistor 103w, a coupling resistor 105w, a Schmitt level resistor 111w, a common emitter resistor 106w, and an input resistor 101w connected between the base of the transistor 103w and the armature winding of the signal generator G. The differentiator includes a capacitor 109w and a resistor 110w.

The saw-tooth wave generator 3s comprises a field effect transistor 301s, a charging and discharging capacitor 302s, a leakage resistor 303s, a synchronizing transistor 304s connected in parallel with the capacitor 302s, transistors 305s and 306s constituting a current amplifier of the emitter follower configuration, and a load resistor 307s for the emitter follower. The first setting voltage generator 9s includes a variable resistor 900s and a slide arm 901s. The first differential amplifier 10c is composed of a differential amplifier 1000c with one of its input terminals connected to the slide arm 901s of the variable resistor 900s and its output terminal connected to the gate of the field effect transistor 301s. The first integrator 11i is composed of a CR smoothing circuit including integrating resistors 1101i and 1102i and integrating capacitors 1103i and 1104i. The output terminal 1105i at which the integrated and smoothed-out output appears is connected to another input terminal of the differential amplifier 1000c.

The rectangular wave generator 4r comprises a comparing saturable amplifier 401r with one of its input terminals X connected to the emitter of the last-stage transistor 306s in the saw-tooth wave generator 3s, a transistor 402r of the emitter follower configuration for amplifying the rectangular pulse delivered from the comparing saturable amplifier 401r, and a load resistor 403r for the transistor 402r. The second integrator 5s is composed of a CR smoothing circuit including an integrating resistor 501s and an integrating capacitor 502s. The second setting voltage generator 12s is composed of a variable resistor 1200s and a slide arm 1201s. The second differential amplifier 6c is composed of a differential amplifier 600c with one of its input terminals connected to the output terminal 503s of the second integrator 5s and another input terminal connected to the slide arm 1201s of the variable resistor 1200s constituting the second setting voltage generator 12s.

The ignition device O comprises a capacitor 701 and a resistor 702 constituting a differentiator, an amplifying transistor 704, a load resistor 703 for the transistor 704, an ignition coil 804, a silicon controlled rectifier 805 connected in series with the primary winding of the ignition coil 804, an ignition plug 807 connected in parallel with the secondary winding of the ignition coil 804, a discharging capacitor 803 for ignition, and a DC–DC converter 802. The fuel injection device P includes a control section $P_1$ having an electromagnetically controlled fuel injection valve, and an input coupling capacitor $P_2$ connected between the input terminal of the control section $P_1$ and the emitter of the transistor 402r in the output stage of the rectangular wave generator 4r. A constant voltage circuit 13 supplies electrical power at constant voltage to the respective circuits described above and has its positive terminal Y, negative terminal Z and grounded terminal E connected to the corresponding terminals shown in FIG. 11. The reference numeral 14 designates a power supply battery.

Figure 12:
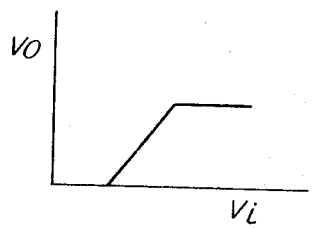
FIG. 12 shows an input-output characteristic of the first and second comparators in the system shown in FIG. 10.
Figure 13:
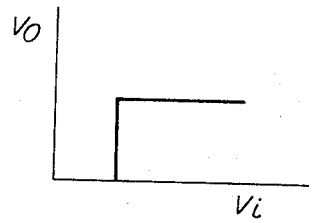
FIG. 13 shows an input-output characteristic of the comparing saturable amplifier in the system shown in FIG. 10.
Figure 14:
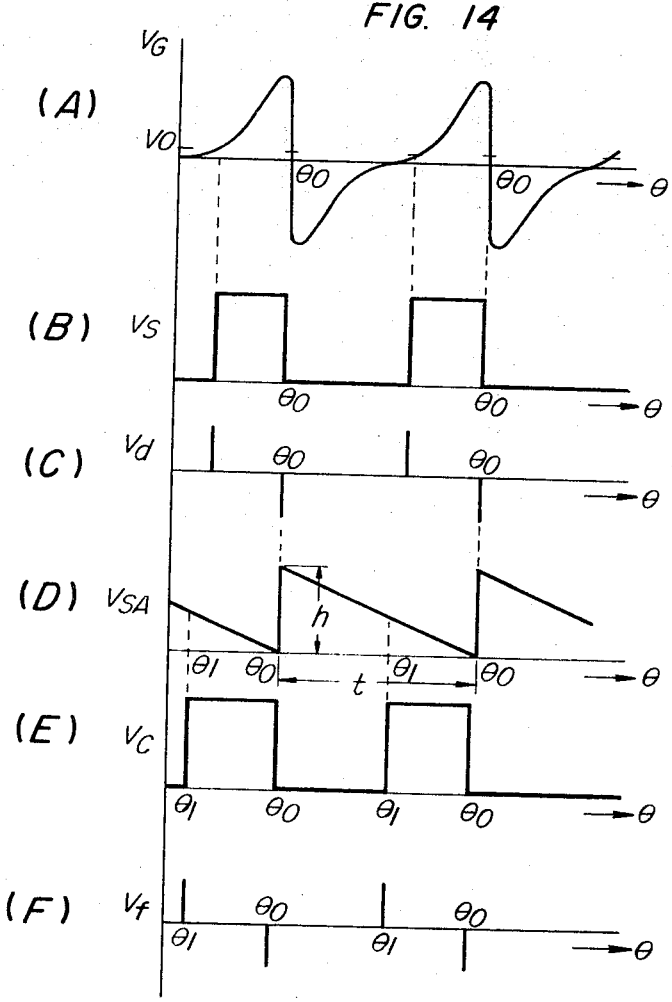
FIG. 14 shows waveforms appearing at various parts of the system shown in FIG. 10.

The operation of the ignition control system of the present invention the detailed structure of which is shown in FIG. 11 will be described with reference to FIGS. 12, 13, and 14. The horizontal axis of FIGS. 14(A), 14(B), 14(C), 14(D), 14(E), and 14(F) represent the rotational angle $\theta$ of the engine crankshaft. As the rotor of the signal generator G rotates in synchronism with the rotation of the engine, a voltage $V_G$ having a waveform as shown in FIG. 14(A) is generated across the armature winding. The Schmitt circuit in the wave shaping circuit 1w is adapted to operate at a voltage level $V_o$ in FIG. 14(A) so that a rectangular pulse $V_s$ as shown in FIG. 14(B) appears at the collector of the transistor 107w in the Schmitt circuit. More precisely, when the generated voltage $V_G$ applied to the base of the transistor 103w through the input resistor 101w exceeds the voltage level $V_o$, the transistor 103w conducts and the transistor 107w is cut off with the result that the collector voltage of the transistor 107 w is increased up to about the power supply voltage. Then, when the generated voltage $V_G$ is reduced below the voltage level $V_o$, the transistor 103w is cut off and the transistor 107w conducts with the result that the collector voltage of the transistor 107w is reduced to substantially the ground potential. Consequently, the collector voltage of the transistor 107w has a wave-form as shown in FIG. 14(B). In this case, the voltage level $V_o$ is selected to be a sufficiently small value. The falling point $\theta_o$ of the collector voltage $V_s$ of the transistor 107w in the Schmitt circuit can be kept constant independently of the number of revolutions per unit time of the engine since the generated voltage $V_G$ falls substantially vertically as shown in FIG. 14(A). The pulse voltage appearing at the collector of the transistor 107w in the Schmitt circuit is differentiated by the differentiator composed of the capacitor 109w and the resistor 110w to obtain a differentiated waveform $V_d$ as shown in FIG. 14(C). This differentiated waveform $V_d$ is applied to the base of the transistor 304s in the saw-tooth wave generator 3s so that the transistor 304s conducts and is cut off and the capacitor 302s is charged and discharged with the result that a saw-tooth waveform $V_{SA}$ as shown in FIG. 14(D) appears across the resistor 307s connected to the emitter of the transistor 306s, the saw-tooth waveform being in synchronism with angular position $\theta_o$ of rotation of the crankshaft. The saw-tooth waveform is applied to the first integrator 11i composed of the integrating resistors 1101i and 1102i and the integrating capacitors 1103i and 1104i so that a DC voltage whose level is proportional to the area of the saw-tooth waveform, that is, an integrated and smoothed-out DC voltage appears at the output terminal 1105i of the integrator 11i. The DC voltage appearing at the output terminal 1105i of the integrator 11i and the first setting voltage appearing at the variable resistor 900s of the first setting voltage generator 9s are applied to the differential amplifier 1000c in the first differential amplifier 10c where the differential amplifier 1000c detects the difference between these two input voltages and delivers an output voltage corresponding to the voltage differential for applying it to the gate of the field effect transistor 301s. A current corresponding to the output voltage of the differential amplifier 1000c is supplied from the field effect transistor 301s to the saw-tooth wave generator 3s through the capacitor 302s. When the DC output voltage of the first integrator 11i is smaller than the first setting voltage, the output voltage of the differential amplifier 1000c is increased in the positive-going direction to increase the area of the saw-tooth waveform, while when the DC output voltage of the first integrator 11i is larger than the first setting voltage, the output voltage of the differential amplifier 1000c is increased in the negative-going direction to decrease the area of the saw-tooth waveform, thereby finally correcting the area of the saw-tooth waveform so that it matches the first setting voltage. Thus, the area per unit time and the peak value of the saw-tooth waveform can be kept constant. Suppose that the duration of the saw-tooth waveform shown in FIG. 14(D) is $t$ and the peak value is $h$, then the area $S$ of the saw-tooth waveform is expressed as $S = \frac{1}{2}th$ and the area per unit time is expressed as $ns = \frac{1}{2}th \times 1/t = \frac{1}{2}h$, which is constant, where $n$ is a number of saw-tooth waves per unit time. The relationship between the input voltage differential $V_i$ and the output voltage $V_o$ of the differential amplifier 1000c is as shown in FIG. 12.

The saw-tooth waveform appearing across the lead resistor 307s for the transistor 306s disposed in the output stage of the saw-tooth wave generator 3s is applied to the comparing rectangular wave generating means 401r in the rectangular wave generator 4r so that the comparing saturable amplifier 401r generates a rectangular pulse $V_c$ as shown in FIG. 14(E) when the saw-tooth waveform attains a preset level. The rectangular pulse is amplified by the transistor 402r to appear across the resistor 403r to be applied to the second integrator 5s. The integrating resistor 501s and the integrating capacitor 502s constituting the second integrator 5s integrate and smooth out the rectangular pulse which is thereby turned into a DC voltage of a level proportional to the pulse width, the DC voltage being then applied to one of the input terminals of the differential amplifier 600c in the second differential amplifier 6c. The second setting voltage appearing at the variable resistor 1200s of the second setting voltage generator 12s is applied to another input terminal of the differential amplifier 600c to determine the ignition timing and fuel injection timing. The differential amplifier 600c delivers an output voltage corresponding to the difference between these two input voltages and this output voltage is applied to another input terminal of the comparing saturable amplifier 401r to vary the preset level. Thus, when the DC output voltage of the second integrator 5s is smaller than the second setting voltage, the output voltage of the differential amplifier 600c acts to raise the preset level so that the rectangular pulse starts to rise at an earlier time and the pulse width is thereby increased, while when the DC output voltage of the second integrator 5s is larger than the second setting voltage, the output voltage of the differential amplifier 600c acts to lower the preset level so that the rectangular pulse starts to rise at a later time and the pulse width is thereby decreased. Consequently, the pulse width of the rectangular pulse is corrected to match the second setting voltage determining the ignition timing and fuel injection timing. The relationship between the input voltage differential $V_i$ and the output voltage $V_o$ of the comparing saturable amplifier 401r is as shown in FIG. 13.

The rectangular pulse signal thus appearing across the load resistor 403r for the transistor 402r disposed in the output stage of the rectangular wave generator 4r is differentiated by the differentiator composed of the capacitor 701 and the resistor 702 to obtain a differentiated waveform $V_f$ as shown in FIG. 14(F). The positive pulse in the differentiated waveform $V_f$ is amplified by the transistor 704 to be applied to the gate of the silicon controlled rectifier 805. As the silicon controlled rectifier 805 conducts, the charge stored in the capacitor 803 by being charged by the DC output voltage of the DC–DC converter 802 is discharged through the primary winding of the ignition coil 804, and a high voltage momentarily induced across the secondary winding of the ignition coil 804 is supplied to the ignition plug 807 to cause a spark across the spark gap. A part of the rectangular pulse signal is applied through the capacitor $P_2$ to the control section $P_1$ of the fuel injection device P so as to energize the fuel injection valve and inject the fuel at the fuel injection timing determined by the rectangular pulse signal.

The ignition timing and fuel injection timing may be suitably regulated by varying the second setting voltage generated by the second setting voltage generator 12s.

In the second embodiment described above, arrangement has been such that the voltage corresponding to the difference between the DC voltage obtained by integrating the rectangular pulse signal and the second setting voltage is negatively fed back to the rectangular wave generator 4r for the purpose of very accurately controlling the pulse width and the rising time of the rectangular pulse depending on the second setting voltage. However, the second setting voltage may be directly applied to the rectangular wave generator 4r so as to vary the preset level.

Further, in the second embodiment described above, the second setting voltage generator 12s generating the second setting voltage for determining the ignition timing and fuel injection timing has been composed of the variable resistance 1200s. However, the second setting voltage generator 12s may be composed of an electronic circuit which detects the operating parameters of the engine such as the number of revolutions, the load, the temperature, etc. of the engine and generates the second setting voltages for determining the ignition timing and fuel injection timing on the basis of these factors.

Furthermore, the wave-shaping circuit 1, the engine speed detector 2 and the saw-tooth wave generator 3 in the first embodiment as described above in connection with FIG. 2 may be dispensed with, provided that the voltage waveform can determine a particular angular position of rotation of the engine, that is, the voltage waveform suddenly changes at a particular angular position of rotation and has a gradual and linear slope (either rising or falling) for a range of the angle of rotation (for instance, between 10° and 30° before the top dead center) in which the ignition timing point is to be preset.

We claim:

1. A timing signal generating system for internal combustion engines comprising;

a timing signal generator for generating a signal voltage in a predetermined angular position of rotation of the engine in synchronism therewith, a rectangular wave generator for generating a rectangular pulse of a constant amplitude when the signal voltage generated by said timing signal generator reaches a preset level, an integrator for integrating the output voltage of said rectangular wave generator thereby to produce a DC output voltage which is proportional to the on-off ratio of the rectangular wave, and a differential amplifier operative upon receiving the DC output voltage of said integrator and a preset signal voltage corresponding to a desired timing to produce an output signal representative of the difference between said two voltages, the output signal of said differential amplifier being fed back to said rectangular wave generator as an input voltage to the latter, and a signal being derived from the output terminal of said rectangular wave generator.

2. A timing signal generating system as in claim 1 comprising;

a wave shaping circuit for generating a synchronizing signal indicative of a reference angular position of rotation of the engine in response to the output signal of said timing signal generator, and a saw-tooth generator for generating a saw-tooth wave of constant magnitude in synchronism with the output pulse signal of said wave shaping circuit.

3. A timing signal generating system as in claim 1 comprising;

a wave shaping circuit for generating a synchronizing signal indicative of a reference angular position of rotation of the engine in response to the output signal of said timing signal generator, an engine speed detector for generating an output voltage which is linearly related to the engine speed, and a saw-tooth wave generator for generating a saw-tooth wave whose voltage level is kept substantial constant in any given angular position of rotation of the engine by the output of said engine speed detector, the saw-tooth wave being reset by the synchronizing signal, wherein said rectangular wave generator includes means for generating a rectangular wave in response to the saw-tooth wave of the saw-tooth generator and another input voltage, the rectangular wave having its leading edge corresponding to the occurrence of the synchronizing signal and its trailing edge corresponding to a point in the saw-tooth wave determined by said another input voltage.

4. A timing signal generating system for internal combustion engines comprising a timing signal generator for generating a signal voltage in a predetermined angular position of rotation of the engine in synchronism therewith, a wave shaping circuit for generating a synchronizing signal indicative of a reference angular position of rotation of the engine in response to the output signal of said timing signal generator, a saw-tooth wave generator for generating a saw-tooth wave of constant magnitude in synchronism with the output pulse signal of said wave shaping circuit, an integrator for integrating the saw-tooth wave delivered from said saw-tooth wave generator thereby to produce a DC voltage of a level which is proportional to the area of the saw-tooth wave, a first setting voltage generator for generating a first setting voltage to maintain the area of the saw-tooth wave constant, a differential amplifier operative upon receiving the first setting voltage produced by said first setting voltage generator and the output voltage of said integrator to produce an output voltage representative of the difference between the two voltages, the output voltage of said differential amplifier being applied to said saw-tooth wave generator as a negative feedback input so as to maintain the area per unit time of the saw-tooth wave constant, a rectangular wave generator for generating a rectangular pulse of a constant amplitude when the saw-tooth wave delivered from said saw-tooth wave generator reaches a preset level, and a second setting voltage generator for generating a second setting voltage which establishes the preset level and applying same to said rectangular wave generator.

5. A timing signal generating system as claimed in claim 3, wherein said wave shaping circuit comprises a Schmitt circuit composed of transistors connected to said timing signal generator, a differentiator composed of a capacitor and a resistance connected to said Schmitt circuit for differentiating the output of said Schmitt circuit, and a transistor amplifier connected to said differentiator for amplifying the output of said differentiator.

6. A timing signal generating system as claimed in claim 3, wherein said engine speed detector comprises a monostable multivibrator and an integrator composed of a resistor and a capacitor connected to said monostable multivibrator.

7. A timing signal generating system as claimed in claim 3, wherein said saw-tooth wave generator comprises a differential amplifier for amplifying the difference between the output voltage of said engine speed detector and a reference voltage, a capacitor, a resetting transistor for charging or discharging said capacitor, and a field effect transistor for controlling the charging or discharging of said capacitor, said differential amplifier being connected to the gate of said effect transistor to bias the gate of said field effect transistor thereby to increase the inclination of the saw-tooth wave with the increase in the number of revolutions per unit time of the engine.

8. A timing signal generating system as claimed in claim 3, wherein said rectangular wave generator comprises a comparing saturable amplifier and an amplifying transistor for amplifying the output of said comparing saturable amplifier.

9. A timing signal generating system as claimed in claim 4, wherein said wave shaping circuit comprises a Schmitt circuit composed of transistors connected to said timing signal generator, a differential composed of a capacitor and a resistance connected to said Schmitt circuit for differentiating the output of said Schmitt circuit, and a transistor amplifier connected to said differentiator for amplifying the output of said differentiator.

10. A timing signal generator system as claimed in claim 4, wherein said saw-tooth wave generator comprises a capacitor, a resetting transistor for charging or discharging said capacitor, and a field effect transistor for controlling the charging or discharging of said capacitor.

11. A timing signal generating system as claimed in claim 4, wherein said rectangular pulse generator comprises a comparing rectangular wave generating means connected to the output side of said saw-tooth wave generator and a transistor amplifier connected to said comparing saturable amplifier.

12. A timing signal generating system as claimed in claim 4, further comprising a second integrator for integrating the output of said rectangular wave generator and for generating an output proportional to the on-off ratio of the rectangular wave, and a second differential amplifier for generating an output voltage representative of the difference between the output of said second integrator and the output of said second setting voltage generator, said output voltage of said second differential amplifier being fed as a negative feedback input to said rectangular wave generator.

13. A timing signal generating system for internal combustion engines comprising a timing signal generator for generating a signal voltage in a predetermined angular position of rotation of the engine in synchronism therewith, a wave shaping circuit for generating a synchronizing signal indicative of a reference angular position of rotation of the engine in response to the output signal of said timing signal generator, a saw-tooth wave generator for generating a saw-tooth wave of constant magnitude in synchronism with the output pulse signal of said wave shaping circuit, an integrator for integrating the saw-tooth wave delivered from said saw-tooth wave generator thereby to produce a DC voltage of a level which is proportional to the area of the saw-tooth wave, a first setting voltage generator for generating a first setting voltage to maintain the area of the saw-tooth wave constant, and a differential amplifier operative upon receiving the first setting voltage produced by said first setting voltage generator and the output voltage of said integrator to produce an output voltage representative of the difference between the two voltages, the output voltage of said differential amplifier being applied to said saw-tooth wave generator as a negative feedback input so as to maintain the area per unit time of the saw-tooth wave constant.

14. A timing signal generating system for internal combustion engines comprising a timing signal generator for generating a signal voltage in a predetermined angular position of rotation of the engine in synchronism therewith, a wave shaping circuit for generating a synchronizing signal indicative of a reference angular position of rotation of the engine in response to the output signal of said signal generator, a saw-tooth wave generator for generating a saw-tooth wave of constant magnitude in synchronism with the output pulse signal of said wave shaping circuit, a rectangular wave generator for generating a rectangular pulse of constant amplitude when the saw-tooth wave generated by said saw-tooth wave generator attains a preset level, an integrator for integrating the output voltage of said rectangular wave generator thereby to produce a DC output voltage which is proportional to the on-off ratio of the rectangular wave, and a differential amplifier operative upon receiving the DC output voltage of said integrator and a preset signal voltage corresponding to a desired timing to produce an output signal representative of the difference between said two voltages, the output signal of said differential amplifier being fed back to said rectangular wave generator as an input voltage to the latter, and a signal being derived from the output terminal of said rectangular wave generator.

15. A timing signal generating system for internal combustion engines comprising a signal generator for generating a signal voltage in a predetermined angular position of rotation of the engine in synchronism therewith, a wave shaping circuit for generating a synchronizing signal indicative of a reference angular position of rotation of the engine in response to the output of the signal generator, an engine speed detector for generating an output voltage which is linearly related to the engine speed, a saw-tooth wave generator for generating a saw-tooth wave whose voltage level is kept substantially constant in any given angular position of rotation of the engine by the output of the engine speed detector, the saw-tooth wave being reset by the synchronizing signal, a rectangular wave generator for generating a rectangular wave in response to the saw-tooth wave of the saw-tooth wave generator and another input voltage, the rectangular wave having its leading edge corresponding to the occurrence of the synchronizing signal and its trailing edge corresponding to a point in the saw-tooth wave determined by said another input voltage, an integrating circuit for integrating the output voltage of the rectangular wave generator to produce a DC output voltage which is proportional to the on-off ratio of the rectangular wave, and a differential amplifier for receiving the DC output voltage of the integrating circuit and a preset signal voltage corresponding to a desired timing to produce a voltage difference therebetween, the voltage difference signal of the differential amplifier being fed back to the rectangular wave generator as said another input voltage, a signal being derived from the output of the rectangular wave generator.

16. A timing signal generating system as claimed in claim 15, in which said wave shaping circuit comprises a Schmitt circuit composed of transistors connected to said signal generator, a differentiator composed of a capacitor and a resistance connected to said Schmitt circuit for differentiating the output from said Schmitt circuit, and a transistor amplifier connected to said differentiator for amplifying the output from said differentiator.

17. A timing signal generating system as claimed in claim 15, in which said engine speed detector comprises a monostable multivibrator, and an integrator composed of a resistor and a capacitor connected to said monostable multivibrator.

18. A timing signal generating system as claimed in claim 15, in which said saw-tooth wave generator comprises a differential amplifier for amplifying the difference between the output voltage of said engine speed detector and a reference voltage, a capacitor, a resetting transistor for charging or discharging said capacitor, and a field effect transistor for controlling the charging or discharging of said capacitor, said differential amplifier being connected to the gate of said field effect transistor to bias the gate voltage of said field effect transistor thereby to increase the inclination of the saw-tooth wave with the increase in the number of revolutions of the engine.

19. A timing signal generating system as claimed in claim 15, in which said rectangular wave generator comprises a comparing saturable amplifier and an amplifying transistor for amplifying the output from said comparing saturable amplifier.

20. A timing signal generating system for internal combustion engines comprising a signal generator for generating a signal voltage in a predetermined angular position of rotation of the engine in synchronism therewith, a wave shaping circuit for generating a synchronizing signal indicative of a reference angular position of rotation of the engine in response to the output signal of said signal generator, a saw-tooth wave generator for generating a saw-tooth wave of constant magnitude in synchronism with the output pulse signal of said wave shaping circuit, an integrator for integrating the saw-tooth wave delivered from said saw-tooth wave generator thereby to produce a DC voltage of a level which is proportional to the area of the saw-tooth wave, a first setting voltage generator for generating a first setting voltage to maintain the area of the saw-tooth wave constant, a differential amplifier operative upon receiving the first setting voltage produced by said first setting voltage generator and the output voltage of said integrator to produce an output voltage representative of the difference between the two voltages, the output voltage of said differential amplifier being applied to said saw-tooth wave generator as a negative feedback input so as to maintain the area per unit time of the saw-tooth wave constant, a rectangular wave generator for generating a rectangular pulse of constant amplitude when the saw-tooth wave delivered from said saw-tooth wave generator attains a preset level, and a second setting voltage generator for generating a second setting voltage which establishes the preset level and applying same to said rectangular wave generator.

21. A timing signal generating system as claimed in claim 20, in which said wave shaping circuit comprises a Schmitt circuit composed of transistors connected to said signal generator, a differentiator composed of a capacitor and a resistance connected to said Schmitt circuit for differentiating the output from said Schmitt circuit, and a transistor amplifier connected to said differentiator for amplifying the output from said differentiator.

22. A timing signal generating system as claimed in claim 20, in which said saw-tooth wave generator comprises a capacitor, a resetting transistor for charging or discharging said capacitor, and a field effect transistor for controlling the charging or discharging of said capacitor.

23. A timing signal generating system as claimed in claim 20, in which said rectangular pulse generator comprises a comparing rectangular wave generating means connected to the output side of said saw-tooth wave generator, and a transistor amplifier connected to said comparing saturable amplifier.

24. A timing signal generating system as claimed in claim 20, in which the timing signal generating system further comprises a second integrator for integrating the output of said rectangular wave generator and for generating an output proportional to the on-off ratio of the rectangular wave, and a second differential amplifier for generating an output voltage representative of the difference between the output of said second integrator and the output of said second setting voltage generator, said output voltage of said second differential amplifier being fed as a negative feedback input to said rectangular wave generator.

25. A timing signal generating system for internal combustion engines comprising a signal generator for generating a signal voltage in a predetermined angular position of rotation of the engine in synchronism therewith, a wave shaping circuit for generating a synchronizing signal indicative of a reference angular position of rotation of the engine in response to the output signal of said signal generator, a saw-tooth wave generator for generating a saw-tooth wave of constant magnitude in synchronism with the output pulse signal of said wave shaping circuit, an integrator for integrating the saw-tooth wave delivered from said saw-tooth wave generator thereby to produce a DC voltage of a level which is proportional to the area of the saw-tooth wave, a first setting voltage generator for generating a first setting voltage to maintain the area of the saw-tooth wave constant, and a differential amplifier operative upon receiving the first setting voltage produced by said first setting voltage generator and the output voltage of said integrator to produce an output voltage representative of the difference between the two voltages, the output voltage of said differential amplifier being applied to said saw-tooth wave generator as a negative feedback input so as to maintain the area per unit time of the saw-tooth wave constant.

* * * * *